United States Patent
Shenker et al.

(10) Patent No.: US 9,911,274 B2
(45) Date of Patent: Mar. 6, 2018

(54) SECURE DISTRIBUTED GAMBLING USING STAND-ALONE GAMBLING PLATFORMS FORMED BY INDEPENDENTLY OPERATING COUPLED PAIRS OF GAMBLING MICROPROCESSORS AND MOBILE COMPUTING DEVICES

(71) Applicant: Tapcentive, Inc., San Francisco, CA (US)

(72) Inventors: Gavin Shenker, Los Angeles, CA (US); David Wentker, San Francisco, CA (US); Mike Lindelsee, Redwood City, CA (US); Gabriel Wachob, San Mateo, CA (US)

(73) Assignee: Tapcentive, Inc., San Francisco, CA (US)

( * ) Notice: Subject to any disclaimer, the term of this patent is extended or adjusted under 35 U.S.C. 154(b) by 785 days.

(21) Appl. No.: 14/326,756

(22) Filed: Jul. 9, 2014

(65) Prior Publication Data
US 2015/0018080 A1    Jan. 15, 2015

Related U.S. Application Data

(60) Provisional application No. 61/844,367, filed on Jul. 9, 2013.

(51) Int. Cl.
*G07F 17/32* (2006.01)
*G06Q 20/36* (2012.01)

(52) U.S. Cl.
CPC ....... *G07F 17/3244* (2013.01); *G06Q 20/367* (2013.01); *G07F 17/3223* (2013.01); *G07F 17/3241* (2013.01)

(58) Field of Classification Search
CPC .......... G07F 17/32; G07F 17/3241; A63F 2300/401; A63F 2300/532; A63F 13/12
See application file for complete search history.

(56) References Cited

U.S. PATENT DOCUMENTS

| | | | | |
|---|---|---|---|---|
| 7,515,718 B2 * | 4/2009 | Nguyen | .................. | G06F 21/10 380/278 |
| 8,052,526 B2 * | 11/2011 | Abbott | ................ | G07F 17/3276 463/29 |

(Continued)

FOREIGN PATENT DOCUMENTS

| | | |
|---|---|---|
| EP | 1077437 | 2/2001 |
| JP | 2002-150105 | 5/2002 |

(Continued)

OTHER PUBLICATIONS

"PCT/US2014/046032 International Search Report", dated Oct. 21, 2014, 11 pages.

(Continued)

*Primary Examiner* — Dmitry Suhol
*Assistant Examiner* — Ankit Doshi
(74) *Attorney, Agent, or Firm* — Panitch Schwarze Bellsario & Nadel LLP

(57) ABSTRACT

A secure distributed gambling system and method is described. The system includes a plurality of mobile computing devices and a plurality of secure gambling microprocessors. Each of the plurality of secure gambling microprocessors is coupled with a different one of the plurality of mobile computing devices to provide a plurality of secure stand-alone gambling platforms. A gambling management system is communicatively coupled with one or more of the plurality of secure stand-alone gambling platforms to maintain gambling integrity.

18 Claims, 4 Drawing Sheets

(56) References Cited

U.S. PATENT DOCUMENTS

| | | | |
|---|---|---|---|
| 8,123,618 B2 * | 2/2012 | Karmarkar | G07F 17/32 463/10 |
| 8,469,790 B1 * | 6/2013 | Itkis | G07F 17/3218 463/19 |
| 8,764,566 B2 * | 7/2014 | Miltenberger | G07F 17/32 463/29 |
| 2002/0142825 A1 | 10/2002 | Lark et al. | |
| 2003/0003997 A1 * | 1/2003 | Vuong | G07F 17/32 463/42 |
| 2003/0134675 A1 * | 7/2003 | Oberberger | G06F 21/10 463/29 |
| 2003/0139190 A1 * | 7/2003 | Steelberg | H04N 7/17309 455/456.1 |
| 2007/0087817 A1 | 4/2007 | Beer et al. | |
| 2007/0136817 A1 * | 6/2007 | Nguyen | G06F 21/10 726/26 |
| 2008/0200225 A1 * | 8/2008 | Walker | G07F 17/32 463/7 |
| 2010/0069136 A1 | 3/2010 | Safaei et al. | |
| 2012/0259774 A1 * | 10/2012 | Marti | G06Q 10/02 705/41 |
| 2015/0006513 A1 | 1/2015 | Mashimo | |
| 2015/0018080 A1 | 1/2015 | Shenker et al. | |
| 2015/0356821 A1 | 12/2015 | Entenmann et al. | |

FOREIGN PATENT DOCUMENTS

| | | |
|---|---|---|
| JP | 2003115002 | 4/2003 |
| JP | 5119818 | 1/2013 |
| KR | 1020080069964 A | 7/2008 |
| KR | 101157541 | 8/2012 |

OTHER PUBLICATIONS

"PCT/US2014/046055 International Search Report", dated Oct. 21, 2014, 10 pages.

Int'l Search Report and Written Opinion dated Nov. 22, 2017 in Int'l Application No. PCT/US2017/054726.

* cited by examiner

300

┌─────────────────────────────────────────────────────────────┐
│ Utilize a unique identifier to identify the secure gambling microprocessor. │
│ 310 │
└─────────────────────────────────────────────────────────────┘
                              ↓
┌─────────────────────────────────────────────────────────────┐
│ Determine at least one game supported by an operating system of the mobile │
│ computing device. │
│ 320 │
└─────────────────────────────────────────────────────────────┘
                              ↓
┌─────────────────────────────────────────────────────────────┐
│ Establish a secure communications channel between the gambling management │
│ system and the secure gambling microprocessor. │
│ 330 │
└─────────────────────────────────────────────────────────────┘
                              ↓
┌─────────────────────────────────────────────────────────────┐
│ Transmit the at least one game to the secure gambling microprocessor via the │
│ secure communication channel. │
│ 340 │
└─────────────────────────────────────────────────────────────┘

```
┌─────────────────────────────────────────────────────────────┐
│ Determine the purse value at the secure gambling microprocessor. │
│                              510                             │
└─────────────────────────────────────────────────────────────┘
                               ↓
┌─────────────────────────────────────────────────────────────┐
│ Transmit the purse value to the gambling management system via the secure │
│                     communication channel.                   │
│                              520                             │
└─────────────────────────────────────────────────────────────┘
                               ↓
┌─────────────────────────────────────────────────────────────┐
│                         (Optional)                           │
│ Transmit a log data from a gaming session on the secure gambling │
│ microprocessor to the gambling management system via the secure │
│                     communication channel.                   │
│                              523                             │
└─────────────────────────────────────────────────────────────┘
                               ↓
┌─────────────────────────────────────────────────────────────┐
│                         (Optional)                           │
│ Confirm at the gambling management system the validity of the purse │
│                             value.                           │
│                              526                             │
└─────────────────────────────────────────────────────────────┘
                               ↓
┌─────────────────────────────────────────────────────────────┐
│ Authorize a payment from the gambling management system to a user. │
│                              530                             │
└─────────────────────────────────────────────────────────────┘
                               ↓
┌─────────────────────────────────────────────────────────────┐
│                         (Optional)                           │
│ Remove the customer account, the at least one customer gaming │
│ preference and the value of the purse from the secure gambling │
│                        microprocessor.                       │
│                              533                             │
└─────────────────────────────────────────────────────────────┘
```

FIG. 5

SECURE DISTRIBUTED GAMBLING USING STAND-ALONE GAMBLING PLATFORMS FORMED BY INDEPENDENTLY OPERATING COUPLED PAIRS OF GAMBLING MICROPROCESSORS AND MOBILE COMPUTING DEVICES

CROSS REFERENCE TO RELATED APPLICATION

The present patent application claims priority to the U.S. Provisional Patent Application No. 61/844,367 entitled "System and Method for Remote Control of Gaming Operations" by Gavin Shenker et al., filed Jul. 9, 2013; which is incorporated by reference in its entirety herein.

BACKGROUND

Casino gaming, wagering, gambling and lottery operations are constantly changing and growing in markets around the world. Gambling operations are often carefully implemented and strictly regulated to ensure fairness of operations and to avoid fraud.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3 is a flowchart of a set-up of a secure gambling microprocessor in accordance with an embodiment.

FIG. 5 is a flowchart for unloading of value and other data from a secure gambling microprocessor at the end of a gaming session in accordance with an embodiment.

DESCRIPTION OF EMBODIMENTS

Figure 1:
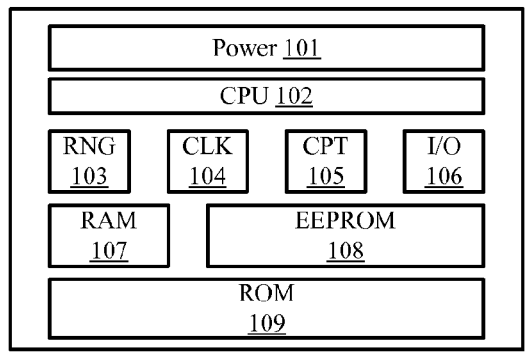
FIG. 1 is a block diagram of a secure gambling microprocessor in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "coupling", "accessing", "changing", "correlating" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Overview

A distributed gaming system based on tamper resistant secure packages where remote network management of the secure package is provided to support changing gaming routines, purse management and reporting on gaming operations particular to this type of technology implementation is described.

For example, a system for gambling operations that include a central gambling management system and one or more consumer electronic devices that can serve as gambling devices for offline gaming. The consumer electronic devices are converted to gambling devices by including a tamper-resistant microprocessor having firmware with gambling code and a purse stored thereon, the tamper-resistant microprocessor running secure gaming software to govern all offline gaming-related routines and communications with the central gambling management system. Examples of computing devices include, but are not limited to, mobile phones, tablet computers, personal computers, home entertainment systems, etc. In the following discussion gambling refers to activities such as, but not limited to, Casino gaming, wagering, lottery operations and the like.

The system includes means for deploying the secure gambling microprocessor in a variety of form factors for use with the consumer electronic devices. Example secure gambling microprocessor form factors include, but are not limited to, smart cards, microSD cards, SIM cards, accessories connected via an input/output (I/O) port, and embedded microprocessors included within the devices. The system also includes means for activating a secure microprocessor, means for loading gaming routines to a secure microprocessor, means for modifying gaming routines in a secure microprocessor, means for securely linking a microprocessor to a specific consumer electronic device, means for establishing a user account in a secure microprocessor, means for loading value to a secure microprocessor, means for unloading value from a secure microprocessor, means for logging gaming results in a secure microprocessor, means for transferring gaming results from a secure microprocessor to the central gambling management system, and means for deactivating a secure microprocessor.

One embodiment involves a centrally managed gambling management system and one or more secure gaming engines deployed in a variety of form factors, and a typical consumer computing device that includes a graphic user interface (GUI) and specialized application software designed to interact with the secure gambling microprocessor and the gambling management system 200. The combination of secure gambling microprocessor and mobile device enables offline gaming as previously described. In one embodiment, the computing device may be a mobile device such as a laptop, tablet or phone; in another embodiment, the computing device may be a less mobile device such as desktop, tower, or the like.

With reference now to FIG. 1, a block diagram of an embodiment of a secure gambling microprocessor 100 is shown. One embodiment of secure gambling microprocessor 100 includes Power 101, a Central Processing Unit (CPU) 102, a Random Number Generator (RNG) 103, a connection for an external Clock 104, a Cryptographic Coprocessor (CPT) 105, an I/O port 106, Random Access Memory (RAM) 107, Electrically Erasable Programmable Read Only Memory (EEPROM) 108, and Read Only Memory (ROM) 109. The software for gaming operations can be stored and run from ROM 109 or EEPROM 108 and would rely on the support of the RNG 103 and CPT 105 for many of the operations.

In general, secure gambling microprocessor 100 is a dedicated computer on a chip or microprocessor for carrying out cryptographic operations, embedded in a packaging with multiple physical security measures, which give it a degree of tamper resistance. Although a number of secure microprocessors may be used herewith. In one embodiment, SmartMX designed by NXP is a microprocessor having data encryption capabilities.

I/O port 106 is a communications interface for secure gambling microprocessor 100 such as a contact interface according to ISO/IEC 7816, contactless interface according to ISO/IEC 14443A, serial input and output (half-duplex), USB, HDMI or other interfaces.

In one embodiment RNG 103 uses a cryptographic hash function to approach a uniform distribution of bits from a non-uniformly random source. In another embodiment, RNG 103 is a pseudo-RNG (PRNG) such as the linear congruential generator. /dev/random is one example of a file that serves as a pseudorandom number generator.

In general, CPT 105 is implemented on a high-security, tamper resistant, programmable PCI board. Specialized cryptographic electronics, microprocessor, memory, and random number generator housed within a tamper-responding secure gambling microprocessor 100 provide a highly secure subsystem in which data processing and cryptography can be performed. In one embodiment, CPT 105 is a high-speed 3-DES coprocessor (64-bit parallel), a high-speed AES coprocessor (128-bit parallel), a PKI (RSA, ECC) coprocessor FameXE (32-bit parallel) such as found on a SmartMX by NXP. However, it should be appreciated that although the SmartMX is disclosed herein, the technology is well suited to using other comparable technologies.

In general, CPU 102 is hardware within a computer that carries out the instructions of a computer program by performing the basic arithmetical, logical, and input/output operations of the system. Two components of CPU 102 are the arithmetic logic unit for performing arithmetic and logical operations, and the control unit for extracting instructions from memory and decoding and executing them, calling on the arithmetic logic unit when necessary. CPU 102 may be multiprocessor, multi-core processors, and the like.

In one embodiment, the communication protocol to the microprocessor may be either ISO-7816 contact, ISO-14443 contactless, or both. Although a number of components are shown, it should be appreciated that secure gambling microprocessor 100 may include more or fewer components. Moreover, in an embodiment, the components described in secure gambling microprocessor 100 may be substituted for other components that provide similar operational capabilities. That is, there are many other options for implementations of the secure gambling microprocessor 100 that could involve other types of processors (micro or otherwise), modules, computing platforms or the like.

Gambling Management System 200

Figure 2:
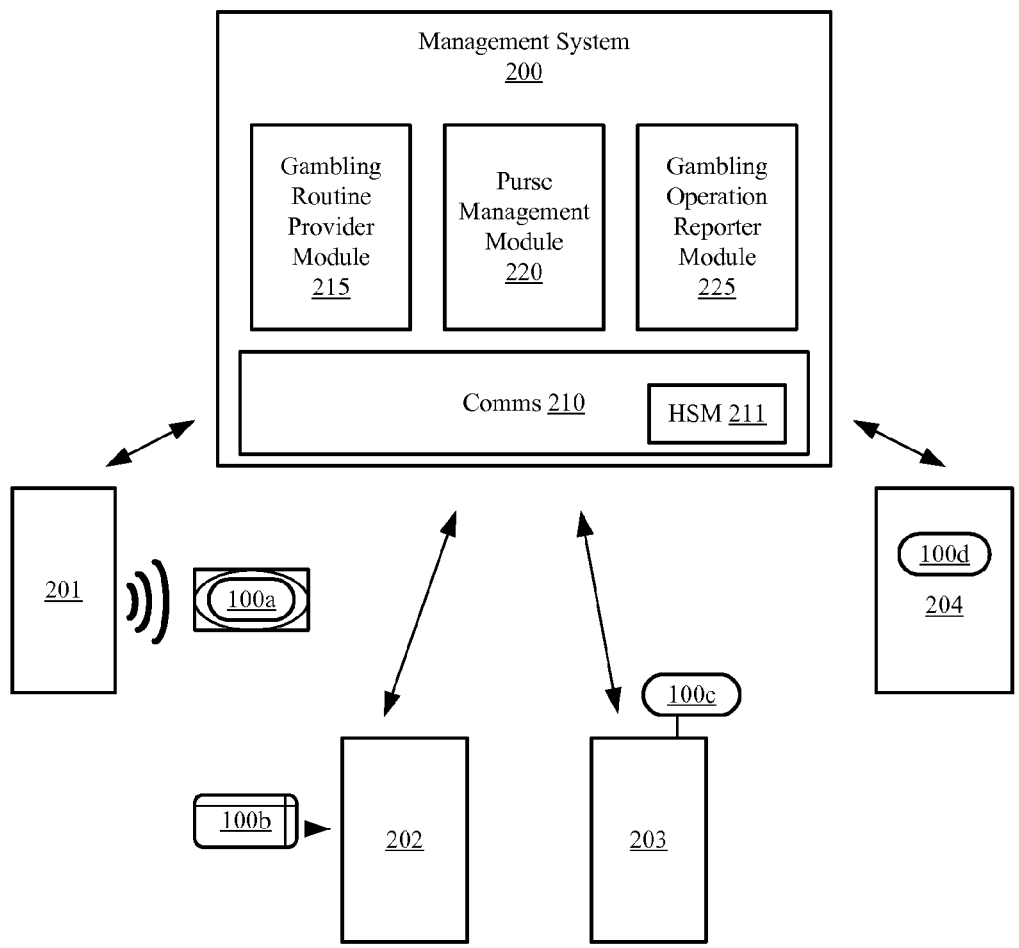
FIG. 2 is a block diagram illustrating the operable interconnections between a gambling management system, and at least one secure gambling microprocessor in accordance with an embodiment.

With reference now to FIG. 2, an embodiment of a gambling management system 200 is shown as part of a network accessible system that includes a human readable management interface such as a Web Browser used to set up and control gaming operations taking place in the secure gambling microprocessor 100 and associated mobile devices 201-204.

In one embodiment, FIG. 2 also includes a plurality of mobile computing devices 201-204, and a plurality of secure gambling microprocessors 100a-100d. In one embodiment, each of the plurality of secure gambling microprocessors 100a-100d are coupled with a different one of the plurality of mobile devices 201-204 to provide a plurality of secure stand-alone gambling platforms. As described in detail herein, gambling management system 200 is communicatively coupled with one or more of the plurality of secure stand-alone gambling platforms to maintain gambling integrity.

In one embodiment, gambling management system 200 includes a gambling routine provider module 215 that contains a number of gambling games such as poker, blackjack, and the like for a number of different user platforms. Gambling management system 200 also includes a purse management module 220 used to manage a purse or monetary amount, and a gambling operation reporter module 225 that is used to review gaming activity for fairness of operation and to avoid fraud. In one embodiment, gambling management system 200 also includes standard network data communications 210 interfaces (e.g. TCP/IP) to support communications with secure gambling microprocessor 100 and mobile devices 201-204.

In one embodiment, gambling management system 200 will also include a dedicated security component such as a hardware security module 211 that is responsible for cryptographic key storage and operations in support of secure communication between the gambling management system 200 and the secure gambling microprocessor 100 and to secure the various management operations that are initiated within the gambling management system 200 and carried out in the secure gambling microprocessor 100. In one embodiment, the secure channel communication between the secure gambling microprocessor 100 and the gaming management system may be over a wired or wireless network. In another embodiment, the secure channel communication may be over a mobile network, or the like.

In one embodiment set up of secure gambling microprocessor 100 by the gambling management system 200 involves in part, the identification of which secure gambling microprocessor 100 will be used in the gaming operation, determining which games will be playable on secure gambling microprocessor 100, which game options will be supported on each, which mobile devices will be used in conjunction with each secure gambling microprocessor 100, and then activating the secure gambling microprocessor 100 by securely transmitting all associated gambling management data thereto.

In an embodiment, the secure gambling microprocessor 100 includes software operating in a tamper-resistant microprocessor. The microprocessors are capable of running multiple, secure, software applications. For example, in one embodiment the secure gambling microprocessor 100 software is responsible for all offline gaming routines and for secure communication with the gambling management system 200.

The security and integrity of the software operations in the microprocessor is maintained through cryptographic operations that take place within the tamper-resistant microprocessor. The security model for this invention relies on "end-to-end" security between the gambling management system 200 and secure gambling microprocessor 100 where the authenticity and integrity of all communication can be verified by either "end" (gambling management system 200 or secure gambling microprocessor 100). The data channel can also be encrypted end-to-end if required. This protection helps mitigate potential fraud involving the transmission of gambling management data to a secure gambling microprocessor 100 that was not created by the gambling management system 200 and similarly protects against fraud involving the transmission of gaming data from a secure gambling microprocessor 100 to the gambling management system 200 that did not originate from a secure gambling microprocessor 100. One embodiment, implements end-to-end communication security via cryptographic operations such as a HSM 211 which provides a secure channel.

In one embodiment, non-secure functions related to the user interface are implemented outside of the secure gambling microprocessor 100. In an embodiment, mobile applications such as those that are designed for the Android or iOS operating systems are used to create the user interface for gaming. The mobile applications then interact with the secure gambling microprocessor 100 via application programming interfaces. These application programming interfaces are also used for any communication between the mobile application and secure gambling microprocessor 100 as required to support communication of management data between the gambling management system 200 and secure gambling microprocessor 100 as described below.

With reference still to FIG. 2, a number of implementations between secure gambling microprocessor 100 and mobile devices are shown. For example, mobile device 201 illustrates an implementation in which secure gambling microprocessor 100a interacts with mobile device 201 via an ISO-14443 contactless interface and antenna. Mobile device 202 illustrates another implementation in which secure gambling microprocessor 100b is a component in a microSD package. Mobile device 203 provides yet another example implementation in which secure gambling microprocessor 100c utilizes an I/O port of the mobile device 203. For example, the I/O port may be an audio jack, USB port, HDMI port, or the like which acts as the communications interface between mobile device 203 and secure gambling microprocessor 100c. Mobile device 204 illustrates yet another embodiment wherein the secure gambling microprocessor 100d is an embedded microprocessor such as a SIM card or chip integrated as a part of the mobile device 204 circuitry.

Contactless Communication Secure Gambling Microprocessor

In one embodiment, secure gambling microprocessor 100a in combination with mobile device 201 illustrates an implementation where the secure gambling microprocessor 100a communicates via contactless with mobile device 201. For example, in one embodiment secure gambling microprocessor 100a includes an integrated ISO-14443 contactless communications interface and antenna, or the like. As such, secure gambling microprocessor 100a is capable of communication with a mobile device 201 or other device that supports ISO-14443, near field communication (NFC) protocols, Bluetooth, or the like.

In operation, mobile device 201 is used to transmit gambling management data from the gambling management system 200 to secure gambling microprocessor 100a by first transmitting the data to a mobile application on the mobile device 201 via the mobile device's Cellular or Wi-Fi radio communications interface. The mobile device 201 then uses its NFC communications interface to transmit the data to secure gambling microprocessor 100a.

In general, the user interface for gaming is implemented as a mobile application. In this particular example, the mobile device could be a mobile phone, tablet computer, laptop computer, notebook computer, personal digital assistant, or the like. For example, mobile device 201 may be running an operating system that includes support for NFC. In one embodiment, gaming takes place by executing the mobile application and ensuring that the secure gambling microprocessor 100a is in proximity to mobile device 201 to support communication between mobile device 201 and secure gambling microprocessor 100a via the NFC to ISO-14443 interfaces.

Insertable Secure Gambling Microprocessor

In one embodiment, secure gambling microprocessor 100b in combination with mobile device 202 illustrates an implementation where the secure gambling microprocessor 100b is a tamper-resistant microprocessor in an insertable package such as, a microSD package. In one embodiment, secure gambling microprocessor 100b is inserted into the mobile device's microSD slot. Once in the slot, the I/O interface of the secure gambling microprocessor 100 uses the contact interface of the microSD card to communicate with the mobile device.

In operation, mobile device 202 is used to transmit gambling management data from the gambling management system 200 to secure gambling microprocessor 100b by first transmitting the data to a mobile application on mobile device 202 via the mobile device's cellular or Wi-Fi radio communications interface. Mobile device 202 then uses its microSD interface to transmit the data to secure gambling microprocessor 100b.

In one embodiment, the user interface for gaming is implemented as a mobile application. In this example, mobile device 202 could be a tablet computer, mobile phone or the like running an operating system that includes support for a microSD card. Gaming takes place by executing the mobile application on mobile device 202 that then interacts with secure gambling microprocessor 100b via the microSD communications interface.

I/O Port Secure Gambling Microprocessor

In one embodiment, secure gambling microprocessor 100c in combination with mobile device 203 illustrates an implementation that involves the packaging of a tamper-resistant secure gambling microprocessor 100c in an accessory device that can then be inserted into a mobile device 203 I/O port. This accessory device includes circuitry that enables communication between secure gambling microprocessor 100c I/O port and mobile device 203, using the I/O interface. As described herein, the I/O port may be an audio jack, an HDMI jack, a USB jack or other communications port.

In operation, mobile device 203 is used to transmit gambling management data from the gambling management system 200 to secure gambling microprocessor 100c by first transmitting the data to a mobile application on mobile device 203 via the mobile device's cellular or Wi-Fi radio communications interface. The mobile device then uses the mobile device's I/O port interface to transmit the data to secure gambling microprocessor 100*c*.

In one embodiment, the user interface for gaming is implemented as a mobile application. In this particular example, mobile device 203 could be a tablet computer, mobile phone or the like, running an operating system that includes support for an I/O port accessory. Gaming takes place by executing the mobile application on mobile device 203 that then interacts with secure gambling microprocessor 100*c* via the I/O port.

Fixedly Integrated Secure Gambling Microprocessor

In one embodiment, secure gambling microprocessor 100*d* in combination with mobile device 204 illustrates yet another implementation that involves more permanent integration of secure gambling microprocessor 100*d* in mobile device 204 in comparison with the previous examples. Examples of this implementation include use of the tamper-resistant Subscriber Identity Module (SIM) of a mobile device to host the secure gambling microprocessor 100 software. Another variation of this implementation could involve hosting of the secure gambling microprocessor 100 software in a tamper-resistant microprocessor that is included as a part of the main circuitry of mobile device 204.

In operation, mobile device 204 is used to transmit gambling management data from the gambling management system 200 to secure gambling microprocessor 100*d* by first transmitting the data to a mobile application on mobile device 204 via the mobile device's cellular or Wi-Fi radio communications interface. The mobile application then uses application programming interfaces to transmit the data to secure gambling microprocessor 100*d*.

In one embodiment, the user interface for gaming is implemented as a mobile application. In this example, mobile device 204 could be a tablet computer, mobile phone, laptop, or the like running an operating system where the device includes a tamper-resistant microprocessor in the form of a SIM or other embedded component. Gaming takes place by executing the mobile application on mobile device 204 that then interacting with secure gambling microprocessor 100*d* via application programming interfaces to secure gambling microprocessor 100*d*.

Although a number of iterations of secure gambling microprocessors are described. It should be noted that secure gambling microprocessor 100 could be built as a standalone system in many form factors such as paper-type advertisements for a magazine, newspaper, poster, etc. Secure gambling microprocessor 100 could also be contained within items such as a key fob, plastic card, etc. In another embodiment, secure gambling microprocessor 100 could also be electronically integrated within larger systems such as a digital billboard system, home entertainment system, home appliance, automobile, kiosk, etc. For examples, secure gambling microprocessor 100 may be implemented in a fashion similar to secure gambling microprocessor 100*d* where secure gambling microprocessor 100 is integrated within a larger system that is typically responsible for data communications and can support the data communication needs of secure gambling microprocessor 100 to the gambling management system 200 and can also provide a user interface for gaming applications.

Mobile Device

In one embodiment, the mobile device 201-204 utilizes mobile operating systems such as, but not limited to, Android, iOS, Windows Phone, RIM Blackberry OS, and the like. It should also be noted that the present invention is platform and device independent. Data communication between the mobile device and gambling management system 200 is accomplished via the integrated cellular and/or Wi-Fi radios of the mobile device.

However, communication between mobile device and secure gambling microprocessor 100 depends upon the type of secure gambling microprocessor package. For example, secure gambling microprocessor 100*a* will utilize an NFC capability in the mobile device, while communication between a mobile device and secure gambling microprocessor 100*b*-100*d* would take place via an application-programming interface of the secure gambling microprocessor and application software running within the mobile device. Although NFC, Wi-Fi, and Cellular radio communication are all cited as examples, any other communications interface capable of transmitting the desired data between the subsystems may be utilized.

Gaming Setup and Management

Reference will now be made to FIG. 3, a flowchart 300 of a method of setting-up secure gambling microprocessor 100 in accordance with an embodiment.

With reference now to 310 of FIG. 3 and FIG. 2, one embodiment utilizes a unique identifier to identify the secure gambling microprocessor 100. For example, each secure gambling microprocessor 100 will be identified by a unique identifier such as a serial number or the like that allows the gambling management system 200 to correctly and securely communicate with each secure gambling microprocessor 100. In one embodiment, the unique identifier is automatically determined by secure gambling microprocessor 100 or gambling management system 200. In another embodiment a Casino operator interacts with the management interface of the gambling management system 200 to provide the unique identifier of secure gambling microprocessor 100.

Referring now to 320 of FIG. 3 and FIG. 2, one embodiment determines at least one game supported by the operating system of the mobile computing device. In one embodiment, the determination is performed by the gambling management system 200. In another embodiment, the determination is performed by a user such as the Casino operator.

With reference now to 330 of FIG. 3 and FIG. 2, one embodiment establishes a communication channel between secure gambling microprocessor 100 and the gambling management system 200 via the computing device. For example, the gambling management system 200 uses secure gambling microprocessor 100 identifiers and internal systems such as the hardware security module 211 to set up Secure Channel communication between the gambling management system 200 and secure gambling microprocessor 100.

With reference now to 340 of FIG. 3 and FIG. 2, one embodiment transmits the at least one game to secure gambling microprocessor 100 via the secure communication channel. For example, the gambling management system 200 transmits all required software and settings to each secure gambling microprocessor 100 and sets the state of those secure gambling microprocessor 100 to active.

In general, there is a wide range of variations on how much or how little software and data is transmitted to the secure gambling microprocessor 100. For example, in one embodiment, all gaming software could be loaded to the secure gambling microprocessor 100 during the data transmission. Alternatively, no gaming software is transmitted as it has been previously loaded via some other process such as during the production and distribution of the tamper-resistant microprocessors hosting the secure gambling microprocessor 100 software.

Customer Account Setup

Figure 4:
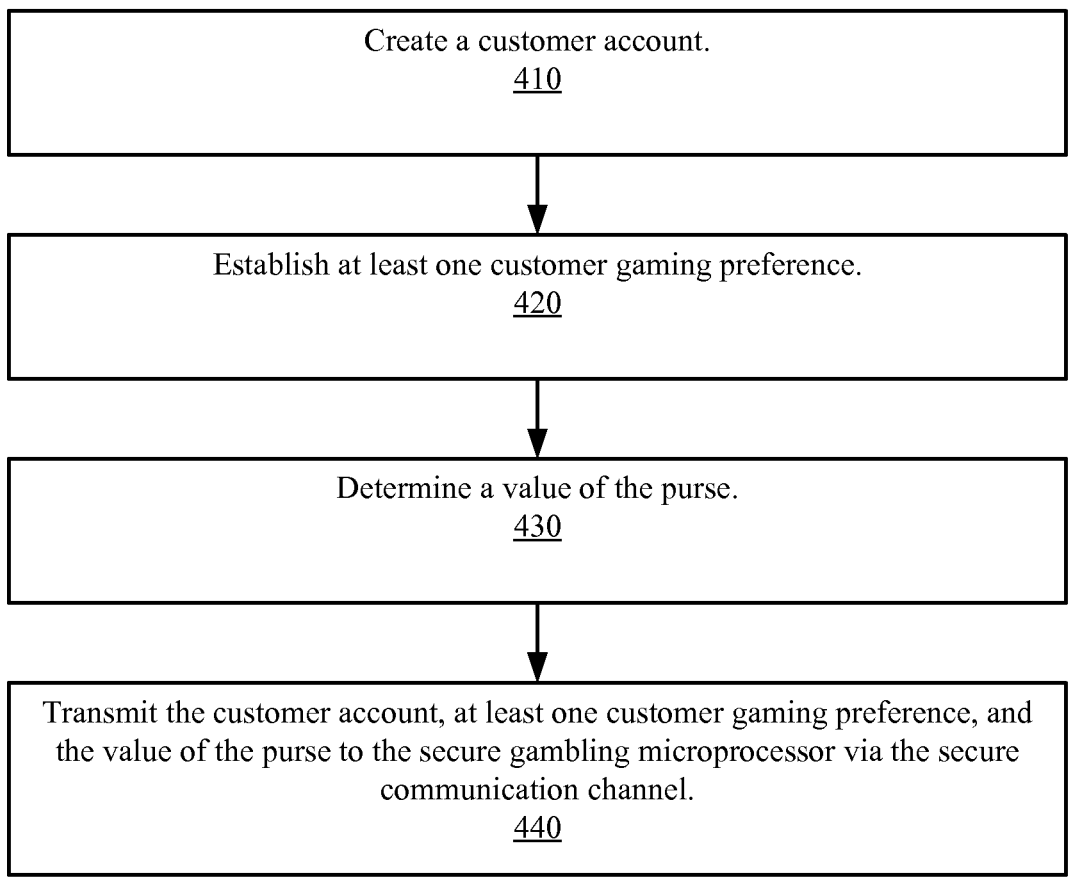
FIG. 4 is a flowchart of the set-up of a Customer account in the gambling management system and a secure gambling microprocessor in accordance with an embodiment.

Reference will now be made to FIG. 4, a flowchart 400 of a method of establishing a customer account for the system in FIG. 2. In general, flowchart 400 may be utilized in a stand-alone format or may be used after the flowchart 300 described in FIG. 3.

Referring now to 410 of FIG. 4 and FIG. 2, one embodiment creates a customer account based on the unique identifier of secure gambling microprocessor 100. In one embodiment, the customer account is automatically created by gambling management system 200. In another embodiment, a Casino operator interacts with the management interface of the gambling management system 200 to create the customer account.

With reference now to 420 of FIG. 4 and FIG. 2, one embodiment establishes at least one customer gaming preference. For example, the customer gaming preference includes specifying what games (pokers, blackjack, slots, etc.) and game preferences (e.g. payout table for poker) the Customer chooses, and the like.

With reference now to 430 of FIG. 4 and FIG. 2, one embodiment determines a value of the purse. That is, how much value the Customer wishes to load to secure gambling microprocessor 100 for gambling, and which secure gambling microprocessor 100 will be used by the Customer.

With reference now to 440 of FIG. 4 and FIG. 2, one embodiment transmits the customer account, the at least one customer gaming preference, and the value of the purse to secure gambling microprocessor 100 via the secure communication channel HSM 111.

In one embodiment, in order to transmit the information, a secure channel is established. In one embodiment the secure channel includes secure communications between secure gambling microprocessor 100 and mobile device 201 with which it will be used. An example of this linking process would be to use some unique identifier from the mobile device 201, such as a MAC Address or the like, to ensure that the secure gambling microprocessor 100 is only used in conjunction with that specific mobile device.

Once the secure communications is established between secure gambling microprocessor 100 and mobile device 102, gambling management system 200 uses secure gambling microprocessor 100 identifiers and internal systems such as the hardware security module 211 to set up secure channel communication between the gambling management system 200 and secure gambling microprocessor 100. In one embodiment, the secure channel is automatically established by gambling management system 200. In another embodiment a Casino operator interacts with the management interface of the gambling management system 200 to establish the secure channel.

Once the secure channel is established, gambling management system 200 transmits all required account data, game settings, link information for the mobile device, and value to secure gambling microprocessor 100. At this point the secure gambling microprocessor 100 can be used with its associated mobile device and mobile application for gaming in a distributed manner. That is, secure gambling microprocessor 100 will allow a user to gamble on the associated mobile device until the purse is empty without requiring the user to access gambling management system 200. In one embodiment, secure gambling microprocessor 100 does not need to contact gambling management system 200 again until the purse needs to be reloaded, a different game is selected by the user, or the user wishes to cash out.

Example Operation

The following is an example of an operation distributed gaming system based on tamper resistant secure packages where remote network management of the secure package is provided to support changing gaming routines, purse management and reporting on gaming operations particular to this type of technology implementation.

In other words, a person can receive a secure gambling microprocessor 100 with a gambling game thereon. The user can couple secure gambling microprocessor 100 with a computing device that includes a graphic user interface (GUI).

For example, a user wishes to play blackjack for real money. The user would order a blackjack secure gambling microprocessor 100. When ordering the blackjack secure gambling microprocessor 100, the user will have a number of choices, including, but not limited to, purchasing a blackjack secure gambling microprocessor 100 with a pre-loaded purse having a pre-defined monetary amount loaded thereon, selecting a free blackjack secure gambling microprocessor 100 with an empty purse, selecting a free blackjack secure gambling microprocessor 100 with a few introductory dollars in the purse, etc.

In one embodiment, if the user has ordered a blackjack secure gambling microprocessor 100 with a preloaded purse, once the secure gambling microprocessor 100 was communicatively coupled with the computing device, the user would be able to begin playing blackjack. In one embodiment, the blackjack secure gambling microprocessor 100 would not need to communicate with gambling management system 200 prior to the user using the secure gambling microprocessor 100 to gamble.

However, if the user selected a blackjack secure gambling microprocessor 100 with an empty purse, or ran out of money in the pre-loaded purse, the user would utilize the computing device to initiate secure communications between gambling management system 200 and the blackjack secure gambling microprocessor 100. During the communications, gambling management system 200 would also be able to perform a number of diagnostics and evaluations, including, but not limited to, providing updates to at least a portion of the secure gambling microprocessor 100; ensuring the security of the secure gambling microprocessor 100; determining the monetary value of the purse; and authorizing transfer of additional funds from a user authorized account, e.g., a bank account, to the purse on the blackjack secure gambling microprocessor 100.

Once the gaming management system had loaded or reloaded the purse in the blackjack secure gambling microprocessor 100, the user would be able to again play blackjack. Moreover, as described above, once the purse had a value and secure gambling microprocessor 100 is securely communicatively coupled with the computing device, the user would be able to gamble without having to maintain any connection with gambling management system 200. In one embodiment, the user could continue to gamble without communicating with gambling management system 200 until the user's purse was empty or the user wanted to cash out.

In an additional example, the user may be tired of playing blackjack or otherwise want to play a different game. In this case, the user will access gambling management system 200 via the secure channel and request gambling management system 200 to add poker (or the like) to the secure gambling microprocessor 100. In one embodiment, gambling management system 200 will add the poker game to the secure gambling microprocessor 100 and the secure gambling microprocessor 100 will have both poker and blackjack. In another embodiment, gambling management system 200 will remove the blackjack game when the poker game is added. In yet another embodiment, gambling management system 200 may offer the user a set of games that can be added to the secure gambling microprocessor 100, or the user may select any number of games from a list of available games.

In another embodiment, gambling management system 200 may contact the user with an offer to provide a new or different game to the user's secure gambling microprocessor 100. In addition, periodic communication may occur between the secure gambling microprocessor and the gambling management system via the communication channel. In general, the periodic communication may include providing updates to at least a portion of the secure gambling microprocessor 100, monitoring a security of the secure gambling microprocessor 100; and determining a monetary value of the purse.

In general, when the games are added or changed, gambling management system 200 will not modify the purse value on the secure gambling microprocessor 100. Thus, if a user had 100 dollars in her purse when she decided to add a poker game to secure gambling microprocessor 100, she would have 100 dollars in her purse after the poker game was added, regardless of whether any other games were removed or not.

Account Value Unload

Reference will now be made to FIG. 5, a flowchart 500 of a method of unloading the value or other data for the system in FIG. 2. In general, flowchart 500 may be utilized in a stand-alone format or may be used after one or more of flowcharts 300 and 400 described in FIGS. 3 and 4 respectively. At flowchart 500, a user decides to "cash out" from gaming, which entails transferring the value from the purse of secure gambling microprocessor 100 to the gambling management system 200.

In general, flowchart 500 is utilized when the user wants to cash out the purse. In general, the user would utilize the computing device to initiate secure communications between gambling management system 200 and the blackjack secure gambling microprocessor 100 as described herein. Gambling management system 200 would determine the size of the purse and provide the funds from the purse to the user in one of a number of payment methods. For example, gambling management system 200 may deposit the funds back into the user's bank account; cut the user a check, or the like.

With reference now to 510 of FIG. 5 and FIG. 2, one embodiment determines the purse value at secure gambling microprocessor 100. For example, gambling management system 200 may automatically identify which secure gambling microprocessor 100 will have its value unloaded and the amount requested by the Customer to be unloaded. In another embodiment, a Casino operator interacts with the management interface of the gambling management system 200 to identify which secure gambling microprocessor 100 will have its value unloaded and the amount requested by the Customer to be unloaded.

With reference now to 520 of FIG. 5 and FIG. 2, one embodiment transmits the purse value to gambling management system 200 via the secure communications channel 211. As described herein, in one embodiment the gambling management system 200 uses the secure gambling microprocessor 100 identifiers and internal systems such as the hardware security module to set up secure channel communication between the gambling management system 200 and secure gambling microprocessor 100.

With reference now to 523 of FIG. 5 and FIG. 2, one embodiment transmits the requested value unload along with optional log data from the gaming session back to the gambling management system 200. In addition, at 526 optional confirmation of the validity of the purse value is performed by gambling management system 200.

With reference now to 530 of FIG. 5 and FIG. 2, one embodiment authorizes payment from gambling management system 200 to the user. In addition, at 533, if the customer has completed gaming with secure gambling microprocessor 100, and the secure gambling microprocessor 100 belongs to the Casino, the Customer's account may also be removed from the secure gambling microprocessor 100 so that a different Customer may use it. In another embodiment, if the secure gambling microprocessor 100 belongs to the Customer, the account will remain on the secure gambling microprocessor 100 for future use.

In other words, the entire mobile device may be reusable. For example, a user may be at a casino and want to play blackjack in his room, at a lunch table, pool side, or the like, but may not have a computing device. The user would go to the cashier's cage and request a mobile device, such as a tablet or the like, with a secure gambling microprocessor 100 coupled therewith. The secure gambling microprocessor 100 on the mobile device would be loaded with the blackjack game and an amount of money added to the purse.

In addition, a mobile device may have more than one player's account thereon. For example, a first user may have an account on a secure gambling microprocessor 100 on a mobile device that includes a number of games and a purse. In addition, a number of additional users may also have an account on the same secure gambling microprocessor 100 on the same mobile device. For example, a first user has his own login to his account and has a purse with a 5,000.00 dollar value. A second user also has her own login to her account on the same device with the same secure gambling microprocessor 100 and she has a purse with a 25,000.00 dollar value. An $n^{th}$ user also has a login to an account on the same device with the same secure gambling microprocessor 100 and has a purse with a 2,000.00 dollar value.

In another embodiment, the games may also be different for one or more user's account on the same device with the same secure gambling microprocessor 100. For example, the first user may only have a blackjack game, the second user may only have a roulette game, and the nth user may have access to a number of games.

The user would then take the mobile device to his room or other location, and play blackjack. When the user was done playing, he would return the mobile device to the cashier's cage. At that time, the blackjack secure gambling microprocessor 100 would communicate with the gaming management system to determine the value of the user's purse. In one embodiment, the determining would also include the gaming management system ensuring the security of the blackjack secure gambling microprocessor 100 and the purse contents thereon. If the user had money in the purse, the user would be paid.

In one embodiment, after the mobile device was returned and the user paid, the secure gambling microprocessor 100 would be returned to default and the mobile device would await the next user.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A distributed gambling system comprising:
a plurality of mobile computing devices;
a plurality of secure gambling microprocessors, each of the plurality of secure gambling microprocessors coupled with a different one of the plurality of mobile computing devices to provide a plurality of secure stand-alone gambling platforms, each of the plurality of secure gambling microprocessors interacting with only the mobile computing device that it is coupled to, each of the secure gambling microprocessors including firmware having gambling code for playing one or more gambling games and a purse for storing a monetary amount for game play, and each of the plurality of secure gambling microprocessors having a unique identifier, wherein the plurality of secure gambling microprocessors adds gambling functionality to their respectively coupled mobile computing devices, and the plurality of mobile computing devices function independently as mobile computing devices without their respectively coupled secure gambling microprocessors; and
a gambling management system communicatively coupled with the plurality of secure stand-alone gambling platforms and configured to communicate with the plurality of secure stand-alone gambling platforms to:
  (i) provide gambling code for playing one or more gambling games to a secure gambling microprocessor, and/or
  (ii) load or unload a monetary amount onto or out of the purse of a secure gambling microprocessor,
wherein the unique identifiers of the secure gambling microprocessors are used to identify the appropriate secure gambling microprocessor for the gambling management system to communicate with, and
wherein the secure stand-alone gambling platforms are configured to operate independently of the gambling management system, and without requiring communication with the gambling management system, when their respective secure gambling microprocessors include gambling code for playing one or more gambling games.

2. The system of claim 1 wherein said secure gambling microprocessor is in a form factor from the group consisting of: smart cards, microSD cards, and SIM cards.

3. The system of claim 1 wherein at least one of the plurality of secure gambling microprocessors is coupled with a different one of the plurality of mobile computing devices via a communications port.

4. The system of claim 1 wherein at least one of the plurality of secure gambling microprocessors is embedded in a different one of the plurality of mobile computing devices.

5. The system of claim 1 wherein said gambling management system comprises:
a gambling routine provider module;
a purse management module; and
a gambling operation reporter module.

6. The system of claim 1 wherein said gambling management system comprises:
a network data communications interface; and
a hardware security module.

7. The system of claim 1 wherein the plurality of mobile computing devices are selected from the group consisting of: mobile phones, tablet computers, laptop computers, notebook computers, and personal digital assistants.

8. The system of claim 1 wherein the gambling management system and the secure gambling microprocessors are configured to provide end-to-end security so that the authenticity and integrity of all communication between the gambling management system and a respective secure gambling microprocessor is verifiable by either the gambling management system or the respective secure gambling microprocessor.

9. The system of claim 1 wherein the secure stand-alone gambling platforms are configured to operate independently of the gambling management system, and without requiring communication with the gambling management system, when their respective secure gambling microprocessors include gambling code for playing one or more gambling games and a purse with a sufficient monetary amount for game play.

10. The system of claim 1 wherein at least some of the secure gambling microprocessors are coupled with their respective mobile computing devices using Near-Field Communication (NFC).

11. The system of claim 1 wherein at least some of the secure gambling microprocessors are coupled with their respective mobile computing devices using Bluetooth.

12. The system of claim 1 wherein the gambling management system is communicatively coupled with the plurality of secure stand-alone gambling platforms via cellular or Wi-Fi communications, and at least some of the secure gambling microprocessors are coupled with their respective mobile computing devices using Near-Field Communication (NFC).

13. The system of claim 1 wherein the gambling management system is further configured to:
create a customer account,
determine a value of the purse,
receive a unique identifier of one of the secure gambling microprocessor for association with customer account, and
transmit the customer account and the value of the purse to the identified gambling microprocessor.

14. The system of claim 13 wherein the gambling management system is further configured to:

establish a customer gaming preference for the customer account, the customer gaming preference including the one or more gambling games that the customer wishes to play, and transmit the customer gaming preference to the identified gambling microprocessor.

15. The system of claim 14 wherein the gambling management system is further configured to:

remove the customer account, the value of the purse, and the customer gaming preference from the identified gambling microprocessor.

16. The system of claim 1 wherein at least some of the secure gambling microprocessors are physically separate from their respective mobile computing devices before being coupled to their respective mobile computing devices.

17. The system of claim 1 wherein at least some of the secure gambling microprocessors are physically separate from their respective mobile computing devices before and after being coupled to their respective mobile computing devices.

18. The system of claim 1 wherein at least some of the secure gambling microprocessors are physically inserted into a slot of their respective mobile computing devices and thus communicate with their respective mobile computing devices via a physical connection.

* * * * *